(No Model.)

D. A. LADD.
BUTTON.

No. 376,890.  Patented Jan. 24, 1888.

Attest:
L. Lee,
Frederick G. Fischer.

Inventor.
Daniel A. Ladd
per Crane & Miller

UNITED STATES PATENT OFFICE.

DANIEL A. LADD, OF NEWARK, NEW JERSEY, ASSIGNOR TO THE NEWARK COLLAR BUTTON COMPANY, OF SAME PLACE.

BUTTON.

SPECIFICATION forming part of Letters Patent No. 376,890, dated January 24, 1888.

Application filed March 3, 1887. Serial No. 229,592. (No model.)

*To all whom it may concern:*

Be it known that I, DANIEL A. LADD, a citizen of the United States, residing at Newark, Essex county, New Jersey, have invented certain new and useful Improvements in Buttons or Studs, fully described and represented in the following specification and the accompanying drawings, forming a part of the same.

This invention consists in a particular means of fastening the hollow head or back of a button or stud upon a hollow shank by flanging over the upper end of such shank within the head or back.

The object of my improvement is to form the head or front or the back of the stud separately from the shank, and to entirely finish and polish the head apart from the shank before it is attached thereto. When the entire stud is formed of rolled gold or plated stock and completely put together before it is polished, as is usual, the friction required to thoroughly clean and polish the internal corners and angles is sometimes sufficient to entirely remove the gold, whereas by my invention the head and shank may be polished separately without the use of so much pressure or friction, and no further finishing is required after the head is applied to the shank.

My invention is shown herein as applied to a round-headed stud, but is equally applicable to studs having hollow flat heads, as will be seen from the description thereof herein.

Figure 1:
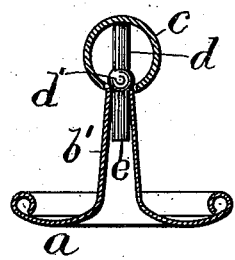
Figure 2:
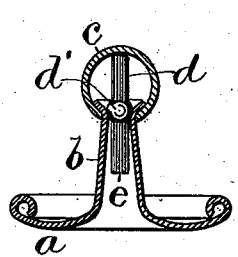

Figure 1 is a vertical section of a stud with a double-ended pin fitted within the shank with the head resting upon the pin. Fig. 2 is a similar section of the stud having the head secured thereon by pressing the head and pin downward upon the shank, and Fig. 3 is an external view of the completed stud.

*a* is the back of the stud. *b* is the shank. *c* is the hollow head; *d*, the double-ended pin, and *d'* a swell or enlargement upon the pin.

The shank of the stud is tubular and formed of yielding metal, and the head is provided with an aperture fitted to slide over the end of the shank, and the pin is formed with a point, *e*, small enough to enter the shank, so that the pin may be placed with such point projecting within and the enlargement of the same resting upon the top of the shank and remain in position while the head is applied. Pressure upon the top of the head then operates to move the head downward upon the shank, while the pin is simultaneously forced into the shank, spreading its end open within the head by means of the enlargement upon the same, as shown in Fig. 2, and thus flanging the end of the shank over permanently. The double-ended pin is shown in the drawings provided with the enlargement in the center of its length; but it is obvious that its position, as also the length of the pin, would vary with the shape of the head to be applied to the hollow shank. Thus if a flat head were to be fastened upon the shank the enlargement upon the pin would be at or near the top of the same, so that when pressure was applied to the top of the head the shank would be flanged over just within the head, instead of without the same, as would be the case if the enlargement were too far from the upper end of the pin.

Figure 3:
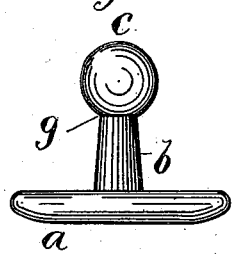

In Fig. 3 will be noticed the corner or angle *g*, which, by my method of construction, requires no polishing after the head is applied to the shank, and which, when the entire stud is polished after the head is applied, requires great care to clean it effectually, so as to be bright and free from tarnish, by reason of the heavy pressure necessary in the operation.

In my invention I polish the head *c*, as well as the back *a* and shank *b*, before securing the two together, and the pressure which applies the head to the shank then suffices to finish the article completely.

Having thus described my invention, what I claim herein is—

The stud consisting of the back *a*, hollow shank *b*, head *c*, and pin provided with an enlargement, the whole arranged and combined as and for the purpose set forth.

In testimony whereof I have hereunto set my hand in the presence of two subscribing witnesses.

DANIEL A. LADD.

Witnesses:
WM. SMITH MORISON,
HENRY J. MILLER.